United States Patent
Iwamura

(10) Patent No.: US 6,473,135 B1
(45) Date of Patent: Oct. 29, 2002

(54) SIGNAL INPUT SELECTOR FOR TELEVISION SET AND METHOD OF IMPLEMENTING SAME

(75) Inventor: Ryuichi Iwamura, San Diego, CA (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/504,857

(22) Filed: Feb. 16, 2000

(51) Int. Cl.$^7$ ................................................ H04N 5/44
(52) U.S. Cl. ......................................................... 348/706
(58) Field of Search ................................. 348/706, 722, 348/725, 705; 358/181; H04N 5/44, 5/45, 5/262, 5/265, 5/268

(56) References Cited

U.S. PATENT DOCUMENTS

| | | | |
|---|---|---|---|
| 4,907,085 A | 3/1990 | Bingham | 358/181 |
| 4,996,597 A | 2/1991 | Duffield | 358/181 |
| 5,161,019 A | 11/1992 | Emanuel | 358/183 |
| 5,193,005 A | 3/1993 | Tomita | 358/191.1 |
| 5,305,105 A | 4/1994 | Heo | 348/485 |
| 5,382,982 A | 1/1995 | Enomoto | 348/706 |
| 5,432,561 A | 7/1995 | Strubble | 248/565 |
| 5,438,375 A | 8/1995 | Sasabe | 348/706 |
| 5,565,929 A | 10/1996 | Tanaka | 348/565 |
| 5,572,263 A | 11/1996 | Kim | 348/705 |

FOREIGN PATENT DOCUMENTS

| | | | |
|---|---|---|---|
| JP | 3-58681 | 3/1991 | |
| JP | 5-207386 | 8/1993 | |
| JP | 5-252463 | * 9/1993 | H04N/5/45 |
| JP | 6-233203 | 8/1994 | |
| JP | 7-23304 | * 1/1995 | |

* cited by examiner

Primary Examiner—David E. Harvey
(74) Attorney, Agent, or Firm—Rader, Fishman, & Grauer PLLC; Ronald P. Kananen, Esq.

(57) ABSTRACT

Management of various audiovisual signal inputs to an entertainment system that includes a television receiver can be performed by a circuit in which a selector switch cyclically monitors the incoming signal inputs with video and audio signal detectors to register which inputs receive active signals. Selector switches for connecting an incoming audio signal and video signal to the television receiver are controlled by a central processing unit in response to the output of the detectors monitoring for active signal sources. Consequently, a user operating a user interface can most efficiently monitor and select active video and audio signal sources for use by the television set.

21 Claims, 3 Drawing Sheets ning. Television sets are
SIGNAL INPUT SELECTOR FOR TELEVISION SET AND METHOD OF IMPLEMENTING SAME

FIELD OF THE INVENTION

The present invention relates to the field of home entertainment. More specifically, the present invention relates to a signal selector for a television set that allows the television to receive and display audio and audiovisual signals from a number of different sources such as a video cassette recorder, digital video disk player, cable television system, compact disk player, etc.

BACKGROUND OF THE INVENTION

In the current field of home entertainment, the use of the basic television sets has expanded far beyond the reception of broadcast television programming. Television sets are now used to receive and display audiovisual or audio signals from a number of sources. For example, a video cassette recorder ("VCR") uses a magnetic head to read an audiovisual signal recorded on a magnetic tape. This signal can be provided to the television set and displayed to allow the user to watch the recorded programming. Digital video disk ("DVD") players perform the same function except that the programming is recorded on an optical disc and read optically by the DVD player.

Additionally, a television set may be connected to a cable television system to which the user has subscribed. Typically, a coaxial cable is connected between a wall outlet and the television set, or a set-top box connected to the television set. The cable network delivers an audiovisual signal to the television set that may carry dozens or even hundreds of channels of television programming that can be tuned and watched by the user.

Similarly, the television set may be connected to a satellite dish, either fixed or moveable, that receives a digital or analog signal via satellite. The audiovisual signal provided by the satellite dish, like the cable television signal, includes dozens or even hundreds of channels of television programming that can be tuned and watched by the user.

Additionally, the television may also receive an audiovisual signal using a conventional antenna, either mounted on the user's roof, or provided at the user's television set, e.g., a rabbit-ears antenna. The conventional antenna can provide an audiovisual signal to the television set that is received by over-the-air broadcast from local commercial television stations.

In an emerging application, a television set may also be used to surf the internet or receive e-mail. Access to the internet may be provided over the cable television system through a set-top box. Alternatively, the television set could receive audiovisual signals from the internet by being connected through a computer or dedicated electronic device to the internet via a modem and conventional public phone line.

A modern entertainment center may include a television set that receives an input signal from any or all of these sources. Consequently, current sophisticated television sets are being designed with a number of input ports or jacks to which various signal sources can be connected.

Where the television set has multiple ports for receiving audiovisual signals from a variety of signal sources, a button on the television set, or on the set's remote control unit, typically allows the user to cycle through connection to the available signal input ports in order to select which of the input signals will be used and displayed by the television set. For example, the default may be to use whatever input signal is provided through a first connector. This connector may be designated "TV" and would typically be connected to a cable television system or a conventional antenna for receiving basic commercial television programming. Whenever the television set is turned on, the set begins displaying the audiovisual signal provided through the first "TV" connector.

The television set in this example, having other connectors for receiving audiovisual signals from other sources, may have, for example, a second connector designated as "Video 1" to which a VCR is connected, a third connector designated as "Video 2" to which a DVD player is connected, and a fourth connector designated as "Video 3" to which a tuner for a satellite dish is connected.

If the user wishes to use a signal coming from a source other than the first default connector, "TV," the user presses the signal selector button on the television or remote control unit. Conventionally, this will switch the signal being received and used by the television set to that of the second connector, "Video 1." Pressing the button again selects the signal from the third connector, "Video 2," and so on.

If the user has just turned on the television set, but wishes to access the satellite dish connected to the "Video 3" connector, the user must press the selection button three times to move through "Video 1" and "Video 2" to "Video 3." This is true even if, for example, no VCR or DVD player are connected to the "Video 1" and "Video 2" connectors respectively as described above. This can be frustrating to the user.

Additionally, the user must remember which signal source, i.e. VCR, DVD player, satellite dish, etc., is connected to which connector, i.e. "Video 1," "Video 2," "Video 3," etc. Again, this can be frustrating to the user.

Consequently, there is a need in the art for a means and method of managing the various input signal sources to a television set to more readily and rapidly allow the user to identify and select the desired and active input signal source.

SUMMARY OF THE INVENTION

It is an object of the present invention to meet the above-described needs and others. Specifically, it is an object of the present invention to provide a means and method of managing the various input signal sources to a television set to more readily and rapidly allow the user to identify and select a desired, active input signal source.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be described as a system for managing a plurality of signal inputs to a television set. In a preferred embodiment, the system of the invention includes a plurality of audio and video signal inputs; a central processing unit; and an active signal detection unit that periodically monitors the signal inputs and signals the central processing unit to indicate which of the signal inputs is receiving an active signal. The active signal detection unit preferably includes a switch for connecting any of the signal inputs to the signal detection unit. The switch continuously cycles to sequentially connect each of the signal inputs in turn to the signal detection unit. Preferably, the signal detection unit includes a video signal detector and an audio signal detector.

The system may also include a primary tuner; and a selector switch controlled by the central processing unit for selectively connecting either the tuner or one of the signal inputs to a cathode ray tube of the television set. The selector switch is controlled by the central processing unit in response to a control signal from a user interface. To increase the ease with which a user can locate a desired input signal, the central processing unit controls the selector switch to automatically skip connections to signal inputs which are inactive when the user interface signals the central processing unit to change the connection state of the selector switch. After skipping the inactive signal inputs, the central processing unit may control the selector switch to connect to signal inputs which are inactive in response to continued actuation of the user interface device signaling a change of input signal source. This is done in anticipation of a signal being provided at the inactive input selected.

When the active signal detection unit detects a newly-active signal from one of the signal inputs, the central processing unit will be apprised of the new signal by the signal detection unit and may alert the user to receipt of the newly-active signal. The central processing unit may alert the user to receipt of the newly-active signal with an audio alert through a speaker of the television set or through a visual alert displayed on the cathode ray tube of the television set.

The central processing unit may also control the selector switch to cycle sequentially to connect the tuner and each active signal input to a video processing circuit. The video processing circuit then prepares a representative frame of each input signal. The representative frames are displayed on the cathode ray tube to generate a visual index of the active input signals. Preferably, the central processing unit repeatedly cycles the selector switch among the tuner and the active signal inputs to refresh the representative frames prepared by the video processing circuit.

The system of the present invention may also include a second selector switch controlled by the central processing unit for selectively connecting either the tuner or one of the signal inputs to a video processing circuit. The video processing circuit adds a secondary input signal received through the second selector switch to a primary input signal received through the first selector switch to create a picture-in-picture display on the cathode ray tube. The picture-in-picture mode can be further augmented by including a second tuner having an output that is provided to the second selector switch.

The central processing unit may automatically connect the second selector switch to a newly-active signal input, as indicated by the active signal detection unit. This provides the newly-active signal in a secondary picture window of the picture-in-picture display to alert a user to the newly-active signal input.

The system of the present invention can also be adapted to a digital television system in which a plurality of digital audiovisual signal inputs are provided. Each digital audiovisual signal input provides a data transport stream and an error flag signal to a transport parser/demultiplexer. The transport parser/demultiplexer provides the error flag signals to the central processing unit so that the central processing unit can determine which of the digital audio visual signal inputs is receiving an active signal. Consequently, the central processing unit controls the transport parser/demultiplexer and a selector switch that selects among the plurality of audio and video signal inputs to connect only active signal inputs to the cathode ray tube of the television set when switching signal sources in response to operation of a user interface.

The present invention also encompasses the methods of implementing and operating the system described above. For example, the present invention expressly includes a method of managing a plurality of audio and video signal inputs to a television set with a central processing unit by periodically monitoring the signal inputs with an active signal detection unit that signals the central processing unit to indicate which of the signal inputs is receiving an active signal so that the central processing unit can manage the various signal inputs accordingly.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
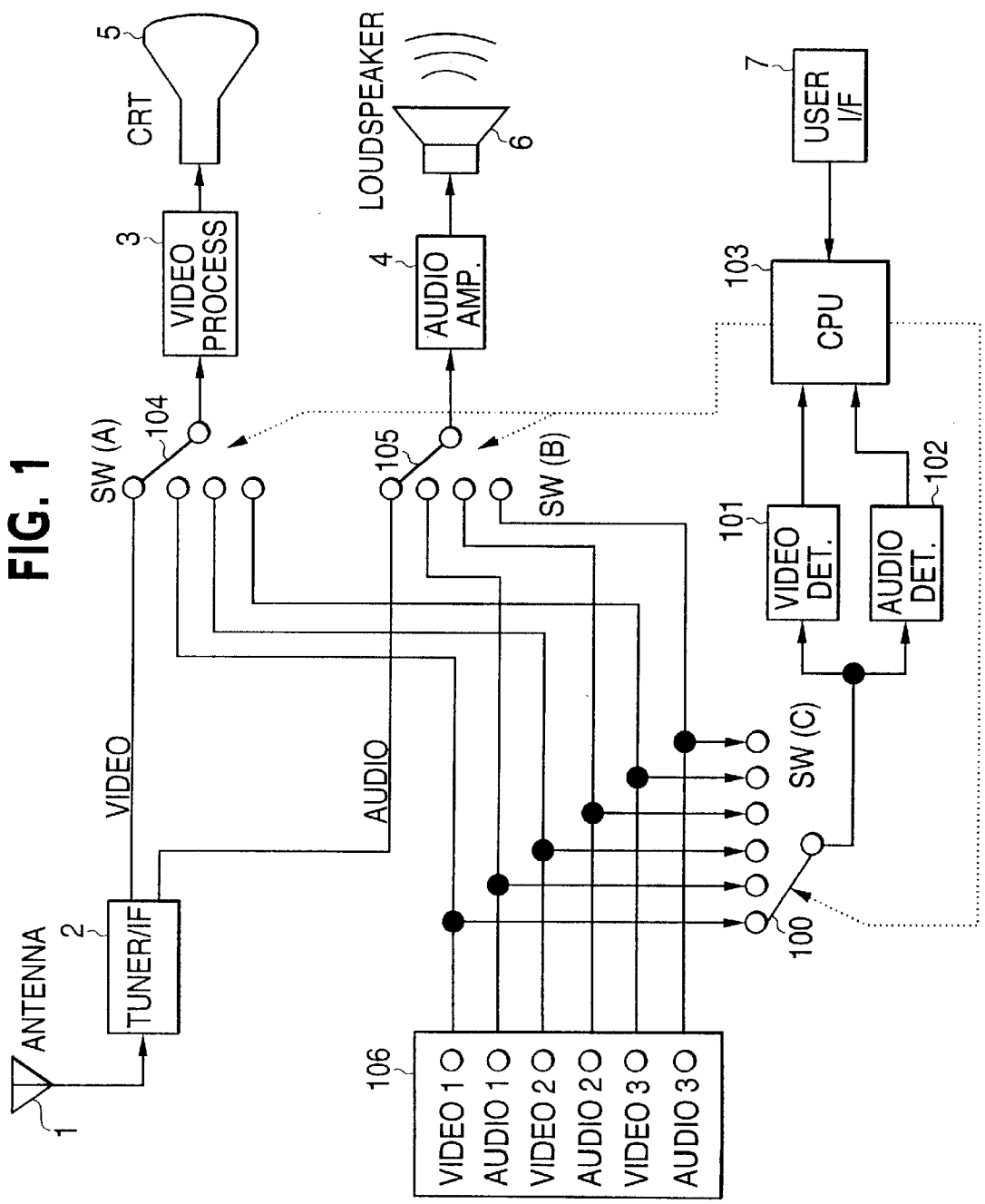
FIG. 1 is block diagram of a circuit for managing multiple audio/video inputs in a home entertainment system according to a first embodiment of the present invention.

FIG. 1 provides a block diagram of the present invention implemented in a conventional analog television set. As shown in FIG. 1, the television set is connected to an antenna (1) for receiving over-the-air broadcasts of commercial television. As will be appreciated by those skilled in the art, the antenna (1) could also be equivalently replaced or supplemented with a co-axial connection to a cable television system. Alternatively, a cable television connection may be made in addition to the antenna (1), through, for example, a set-top box connected to an auxiliary input (106).

A primary tuner (2) receives the signal from the antenna (1) or cable system. The tuner (2), under the control of the user, can tune or select a particular channel of television programming from among the channels included in the composite signal coming from the antenna (1) or. cable system. The tuner (2) then outputs the video and audio signal components of the selected channel for use by the television set.

The video signal is provided to a video processing circuit (3) through a selector switch (104). The video processing circuit (3) processes the video signal for display on the television set and then outputs the processed signal to the cathode ray tube ("CRT") (5) of the television set as shown in FIG. 1. The processed video signal is then displayed on the CRT (5) as a series of visible images.

The audio signal is output from the tuner (2) to an audio amplifier (4) through a second selector switch (105). The audio amplifier (4) amplifies the audio signal and outputs the amplified audio signal to the loudspeaker or speakers (6) of the television set. The loudspeaker (6) renders the audio signal into audible sound that can be heard by the user who is also watching the visible images displayed on the CRT (5).

The television set of the present invention also has additional inputs or connectors (106) for receiving other input audio and video signals. In the example of the present invention illustrated in FIG. 1, three additional connections for video signals and three additional connections for audio signals are illustrated. However, the present invention is not limited to any particular number of input signal connections or signal sources. Moreover, as will be appreciated by those skilled in the art, any pair of video and audio input connections illustrated may be combined in a single physical connector that receives a corresponding connector or jack from a single audiovisual signal source.

The various video inputs, i.e., "Video 1," "Video 2," and "Video 3," are all connected to the video selector switch (104). The switch (104) may selectively connect the video signal from any of the four signal sources with the video processing circuit (3).

Similarly, all the audio inputs, i.e., "Audio 1," "Audio 2," and "Audio 3," are connected to the audio selector switch (105). The switch (105) may selectively connect the audio signal from any of the four signal sources with the amplifier (4). As will be appreciated by those skilled in the art, an audio signal which is not paired with or corresponding to an associated video signal, for example, an audio signal from a radio tuner or a compact disc player, may be provided to any of the audio inputs and output through the television set's speakers (6) without using the television's CRT (5). Additionally, the speakers (6) may be those integrally formed in the cabinet of the television set, or may also include a speaker or speakers external to the television set including, for example, a surround sound system.

The television set of the present invention also includes a central processing unit ("CPU") (103). The CPU (103) controls the position of the video and audio selector switches (104, 105) as shown in FIG. 1. A user interface (7) allows the user to communicate with the CPU (103). The user interface may be, for example, a remote control unit or a control panel on the television set itself. Any device allowing the user to input instructions or settings to the CPU (103) can be incorporated into the user interface (7). Such devices may include, but are not limited to, electronic buttons, switches, dials, knobs, trackballs, and the like.

Consequently, when the user of the television set desires to select a particular video and/or audio signal from among the available inputs, the user inputs an instruction to that effect using the user interface (7). In response, the CPU (103) will correspondingly alter the position or positions of the selector switches (104, 105) so that the desired video and/or audio signal from the input signal sources (106, 1) are provided respectively to the CRT (5) and/or speakers (6) of the television set.

Additionally, each of the auxiliary audio and video signal inputs (106) is also connected to a third selector switch (100). The third selector switch (100) is also controlled by the CPU (103). In a preferred embodiment of the present invention, the CPU (103) causes the switch (100) to repeatedly cycle through the various connections available. For example, the CPU (103) may cause the switch (100) to connect to the "Video 1" input for a predetermined period of time, then switch to the "Audio 1" input for a predetermined period of time, and so on until the switch (100) connects to "Audio 3" for a predetermined period of time. The switch (100) is then returned to connection with the "Video 1" input, and the cycle repeats.

The switch (100) connects the various inputs (106) with a video signal detector (101) and an audio signal detector (102). The video signal detector (101) signals the CPU (103) when a video signal is detected through the connection of the third selector switch (100). Similarly, the audio signal detector (102) signals the CPU (103) when an audio signal is detected through the connection of the third selector switch (100).

As a result, the CPU (103) is continuously apprised of which signal inputs (106) are actively receiving an input signal, either audio or video. Consequently, when the user operates the user interface (7) to cause the television set to switch to a different input signal source, the CPU (103) may cycle through only those signal inputs (106) actively receiving an input signal.

An illustrative example follows. In this example, the user is watching commercial television being received through the antenna (1) or from a cable television system. A VCR is connected to Video 1 and Audio 1 of the signal inputs (106). A compact disc player is connected to Audio 2. Video 2 is not used. A DVD player is connected to Video 3 and Audio 3 of the signal inputs (106).

The user, wishing to watch a DVD, turns on the DVD player (not shown). Consequently, input signals will then be provided to the Video 3 and Audio 3 inputs (106). During its regular cycling, the switch (100) will provide these signals from Video 3 and Audio 3 to the video signal detector (101) and audio signal detector (102). These detectors (101, 102) signal the CPU (103) to indicate the reception of input signals at Video 3 and Audio 3.

The VCR connected to Video 1 and Audio 1 and the CD player connected to Audio 2 are turned off and, therefore, provide no active signals to those respective inputs. The lack of active input signals at Video 1, Audio 1, Video 2 and Audio 2 is also communicated to the CPU (103) through the cyclic sampling of the inputs (106) by the switch (100) and the output of the video and audio detectors (101, 102).

Consequently, the user, wishing to watch a DVD, actuates a control device on the user interface (7) to cause the CPU (103) to alter the position of the switches (104 and 105) which are providing the signal from the antenna (1) or cable television system to the CRT (5) and speaker (6). In response, the CPU (103) will automatically skip the possible connections to Video 1, Audio 1, Video 2 and Audio 2 which are not actively receiving input signals. Rather, the CPU (103) will control the selector switch (104) to connect the video processing circuit (3) with the input signal from Video 3, i.e., the video signal from the DVD player. The CPU (103) will also control the selector switch (105) to connect the audio amplifier (4) with the input signal from Audio 3, i.e., the audio signal from the DVD player.

Thus, the user switches from watching the commercial television programming received through the antenna (1) to the audiovisual output of the DVD player with only a single actuation of the user interface 47). The user need not pass through a connection to the inactive Video/Audio 1 or Video/Audio 2 inputs (106).

Extending this example, if the user actuates the user interface (7) again to switch signal sources, after jumping directly to connection with the active Video/Audio 3 inputs, the CPU (103) may be programmed to assume that the user is about to activate, for example, the VCR or CD player connected to the other, currently inactive inputs (106). Consequently, the CPU (103) will cause the switch (104) to connect the inactive Video 1 input to the video processing circuit (3) and inactive Audio 1 input to the audio amplifier (4) in anticipation of the user activating the signal source, e.g. a VCR, connected to those inputs. A further actuation of the user interface (7) will connect the system to Video/Audio 2, even though inactive. In this way, the system of the present invention is most likely to connect the user to the set of input signals desired as quickly as possible.

If, in the example given above, the VCR, CD player and DVD player had all been turned on and providing active input signals to the inputs (106), actuation of the user interface (7) to switch signal sources would have resulted in the CPU (103) switching the switches (104 and 105) from connection with the antenna (1) to connection with the input signals of the VCR at Video/Audio 1. Another subsequent actuation of the user interface (7) would have switched the television set to reception of the audio signal (Audio 2) from the CD player. And, a third actuation of the user interface (7) would have connected the CRT (5) and speaker (6) to the output of the DVD player (Video/Audio 3).

An advantage of the present invention is that whenever a new input signal is provided to the inputs (106), that new input signal will be detected on the next cycle of the switch (100) through the available inputs (106). Thus, for example, if the user is watching the commercial television signal from the antenna (1) or the cable television system, and none of the signal sources connected to the inputs (106) are turned on, the CPU (103) will register an absence of active input signals using the detectors (101, 102). If the user then switches on the VCR connected to Video/Audio 1, the CPU (103) will register reception of that signal through Video/Audio 1 on the next cycle of the switch (100). Thus, the CPU (103) remains consistently aware of the presence or absence of input signals to the television set and adapts its response to actuation of the user interface (7) accordingly.

Additionally, when a new active signal is first provided to one of the inputs (106), the CPU (103) being apprised of the new input by the detectors (101, 102), may signal the user that a new active signal is being received to prompt the user to switch to that signal, if desired. The CPU (103) may so signal the user by, for example, displaying a textual message on the CRT (6) that identifies reception of the active signal, e.g., "Video/Audio 3 is receiving an active signal." Alternatively, the CPU (103) may signal the user of a newly-active signal input by emitting an audible alert signal from the speaker (6). The audible alert signal may be a simple beep or other sound, or a recorded voice announcing, e.g., "Video/Audio 3 is receiving an active signal."

If the detectors (101, 102) detect no active signals from the inputs (106), the CPU (103) can be programmed to respond accordingly. For example, actuation of the user interface (7) to switch signal sources when no active signals are being received may either be ignored by the CPU (103) or may cause the CPU (103) to connect sequentially (in response to successive actuations of the user interface (7)) to the available inputs (106) in anticipation of an active signal or signals being provided thereto.

The system of the present invention can also be used to provide the user with a quick indication of what programming is being received from each of the available signal inputs (106). In this feature of the present invention, the CPU (103) cycles the switch (104) to successively connect to each of the available video signal inputs (1, 106).

The switch (104) remains connected to each video input for a predetermined brief time, for example, ⅓ seconds which is sufficient time for approximately 10 frames of that video signal to be received by the video processing circuit (3). This segment of the video signal is processed by the video processing circuit (3) to produce a single frame representing the sampled video signal. This frame is preferably decimated or reduced in size, i.e., so as to only occupy a portion of the CRT (5) and is stored in a frame memory of the video processing circuit (3).

When a representative frame has been obtained for each input video signal, all those representative frames are displayed, preferably simultaneously, on the CRT (5) to create an on-screen visual index of the programming being actively received at that time. The user then has a readily-available visual indication of the video signals that are actively available to the television set.

As the switch (104) continues to cycle through and sample the available video input signals, the representative frames, stored in the frame memory of the video processing circuit (3) and displayed on the CRT (5) are sequentially refreshed.

Additionally, the signals from the video signal detector (101) and the audio signal detector (102) signal the CPU (103) to indicate which video and audio signal inputs are active. Consequently, when providing representative pictures of the input signals as described above, the CPU (103) may cycle switch (104) only among the active video inputs that are receiving an active signal. Inactive video inputs are skipped. In this way, the representative pictures can be updated more frequently and more closely track the input video signals from which they are derived.

If a new video signal is input to one of the inputs (106) during this process, it will be detected on the next cycle of the selector switch (100). The CPU (103) can then control switch (104) to include the newly-active video signal in the sampling and visual indexing function. Therefore, a frame representing the newly-active video signal will be added to the on-screen display with the other frames representing the other active video input signals.

If an audio input is active while its paired video input is inactive, the CPU (103) may display a blank frame representing that input in the on-screen visual index. Alternatively the CPU (103) may display a text message on the CRT (5), such as "Audio Only," or an icon or graphic, such as a speaker, to advise the user that no video is available from that signal source.

Figure 2:
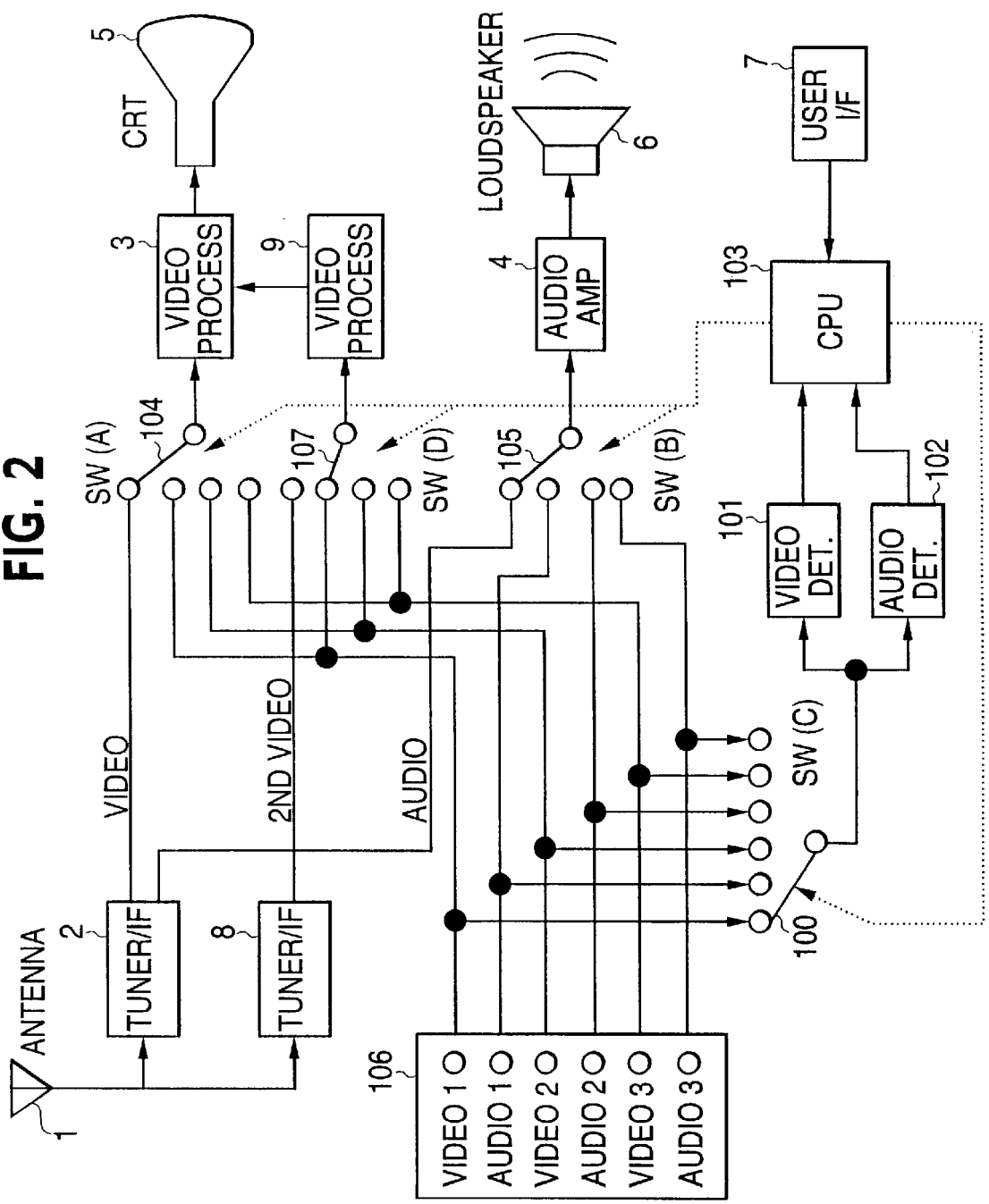
FIG. 2 is block diagram of a circuit for managing multiple audio/video inputs in a home entertainment system according to a second embodiment of the present invention.

FIG. 2, shows a second embodiment of the present invention in which the user is able to simultaneously receive and display two incoming video signals on the CRT (5). This mode is frequently called picture-in-picture.

As shown in FIG. 2, a second tuner (8) is connected to the antenna (1) for receiving over-the-air broadcasts of commercial television. As above, the antenna (1) could also be equivalently replaced with a co-axial connection to a cable television system.

The second tuner (8), under the control of the user, can independently tune or select a particular channel of television programming from among the channels included in the composite signal coming from the antenna (1) or cable system. Thus, if the user wishes to see the programming on a second channel, i.e., a channel other than that tuned by the tuner (2), while still watching and listening to the programming on that channel tuned by the tuner (2), the user can control the second tuner (8) to independently tune the second channel the user wishes to monitor.

The second tuner (8) then outputs the video signal component of the selected channel for use by the television set. The video signal is provided to a secondary video processing circuit (9) through a selector switch (107). As shown in FIG. 2, the selector switch (107) functions identically like the selector switch (104), except that the switch (107) receives the output of the second tuner (8) while the switch (104) receives the output of the first tuner (2).

The secondary video processing circuit (9) processes the video signal received through the selector switch (107) for display on the television set. The output of the secondary video processing circuit (9) is provided to the primary video processing circuit (3). The primary video processing circuit (3) preferably combines the video signal from the secondary video processing circuit (9) with the video signal input to the primary video processing circuit (3) through the selector switch (104).

The resulting composite video signal is output by the primary video processing circuit (3) to the CRT (5). The video signals from the switch (104) and the secondary video processing circuit (9) are preferably combined in such a manner that the image of the video signal from the secondary video processing circuit (9) is displayed in a window superimposed over a portion of the image of the video signal received through selector switch (104). Thus, the user has a picture-in-picture mode in which primary video and audio received through the selector switches (104 and 105) are produced by the television set, while a secondary video signal from another source is also displayed in a smaller window on the CRT (5) within the picture of the primary video.

Additionally, as shown in FIG. 2, both video selector switches (104 and 107) receive all the. possible video input signals from the auxiliary inputs (106). Consequently, the primary video signal taken through the video selector switch (104) can be from tuner (2) or from any of the auxiliary video inputs (106). Additionally, the secondary video signal, displayed in a window in the primary video signal, can be provided via video selector switch (107) from a secondary tuner (8) or from any of the auxiliary video inputs (106).

As will be appreciated by those skilled in the art, the secondary tuner (8) can be connected to the antenna (1) in common with the primary tuner (1) as illustrated in FIG. 2. Alternatively, the secondary tuner (8) may be connected to a cable television system to supplement the signal available to the primary tuner (2) through the antenna (1). Finally, both tuners (2 and 8) may be connected to a cable television system such that use of a terrestrial antenna (1) is eliminated.

Since the CPU (103) is signaled by the video and audio signal detectors (101, 102) of the presence of active signals at the auxiliary inputs (106) through the cycling of selector switch (100), the CPU (103), when controlled by the user interface (7) to select either a primary or secondary video source for picture-in-picture display mode, may automatically skip over inactive video inputs.

Additionally, the picture-in-picture mode described above can be used to alert the user to a newly-active video signal input. For example, if the user is watching a video signal received by the primary tuner (2) through the antenna (1), and a DVD player connected to Video/Audio 3 is turned on and begins supplying a video signal to Video 3, the CPU (103) will be notified of the DVD signal on Video 3 by the video signal detector (101). The CPU (103) can then display the DVD signal as a secondary video signal in a minimized window in the video signal from the primary tuner (2). The CPU (103) does this by controlling video selector switch (107) to connect the DVD signal on Video 3 with the secondary video processing circuit (9).

The user watching the CRT (5) will then see the DVD signal from Video 3 appear in a minimal window superimposed on the primary video display. The user can then, if desired, operate the user interface (7) to cause the CPU (103) to switch the video selector switch (104) to connect the primary video processing circuit (3) with the DVD signal on Video 3. Thus, the primary video signal is then the DVD signal from the Video 3 input. Alternatively, the user can simply deactivate the picture-in-picture mode and resume watching the video signal from the primary tuner (2).

Figure 3:
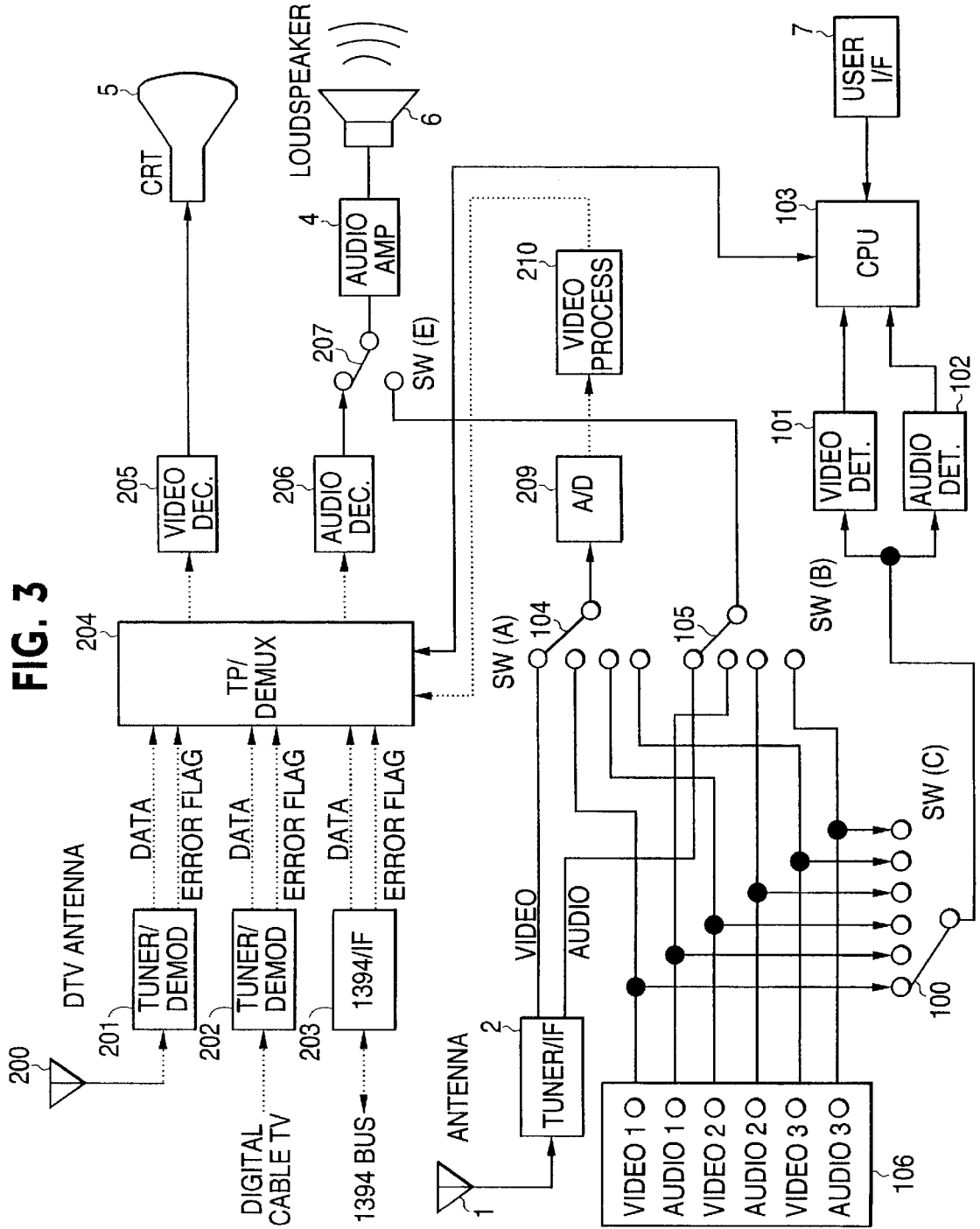
FIG. 3 is block diagram of a circuit for managing multiple audio/video inputs in a home entertainment system according to a third embodiment of the present invention.

FIG. 3 illustrates a third embodiment of the present invention in which the principles of the present invention are adapted for use in a digital television set. Digital television sets, for the foreseeable future, will continue to incorporate analog signal inputs to accommodate purchasers who have only analog signal sources available or who rely on at least one or more analog signal sources in addition to digital signal sources. Consequently, the circuit illustrated in FIG. 3 includes all the elements of the circuit of FIG. 1, with the exception of the video processing circuit (3) of FIG. 1. Identical elements are identically numbered in both figures.

Control signal connections between the CPU (103) and the various switches of FIG. 3 are not shown for the sake of simplicity. However, those of skill in the art will appreciate that the CPU (103) controls the various selector switches shown in FIG. 3 in essentially the same manner illustrated in FIG. 1.

A detailed explanation of the structure illustrated in FIG. 3 that is also illustrated in FIG. 1 and explained in the associated text, will not be repeated here. Those of skill in the art will appreciate that the antenna (1), tuner (2), auxiliary inputs (106), selectors switches (100, 104 and 105), video signal detector (101), audio signal detector (102) and user interface (7) interact and operate in the same manner described above in connection with FIGS. 1 and 2.

In FIG, 3, the analog system described above is supplemented with a digital television system. Three basic sources of digital audio/visual signals are illustrated. The digital television antenna (200) receives over-the-air television signals broadcast in a digital format, such as 8-VSB (vestigial side band) modulated signals.

Signals from the digital television antenna (200) are received by the tuner/demodulator (201) which tunes a particular digital channel in the incoming digital signal and demodulates that signal. The result is a digital data stream that is output to the Transport Parser/Demultiplexer ("TP/Demux") (204). In addition to the data stream, the tuner/demodulator (201) also outputs an error flag signal to the TP/Demux (204). The error flag signal is active or high when there is no signal being received by the tuner/demodulator (201) or when the signal received by the tuner/demodulator (201) is sufficiently poor as to cause significant erroneous data to be introduced into the data transport stream.

Another possible source of digital television signals is connection to a cable television system that broadcasts some or all channels in a digital format, for example, a 256-QAM (quadrature amplitude modulated) signal. If such a connection to a digital cable television system exits, as shown in FIG. 3, the cable system is connected to a second tuner/demodulator (202). The second tuner/demodulator (202) also outputs a data transport stream and error flag signal to the TP Demux (204).

Finally, digital audiovisual signals can be provided to the television set over a digital bus, for example a 1394 bus. This digital bus may, for example, connect the system to a digital video camera/recorder. The digital bus connects to a digital bus interface (203) which provides a data transport stream and error flag signal to the TP/Demux (204) from the incoming bus signal.

The video output of the analog system is also provided, through switch (104), to the TP/Demux (204). The switch (104), controlled by the CPU (103), provides any of the available analog video signals to an analog-to-digital converter (209). The resulting digital video signal is provided to a video processing circuit (210). After processing, the signal is input to the TP/Demux (204).

The TP/Demux (204) is also controlled by the CPU (103) and selects the digital video and audio signals that are output to the CRT (5) and speakers (6) of the television set. The selected digital video signal is provided to a video decoder (205) and then to the CRT (5) for display. The selected digital audio signal is provided to an audio decoder (206) and then to audio amplifier (4) and, finally, to the speaker or speakers (6) of the television set.

A switch (207), controlled by the CPU (103) is also provided between the audio decoder (206) and the audio amplifier (4). If the user wishes to select an analog audio source connected to one of the auxiliary inputs (106), or if the user is viewing an analog video source through switch (104), selector switch (105) can select the appropriate audio source. Switch (207) then connects to the output of selector switch (105) to provide the analog audio signal to the amplifier (4) and speaker (6).

The TP/Demux (204) also provides the various error flag signals received from the tuner/demodulators (201, 202, 203) to the CPU (103). From the error flag signals, the CPU (103) can determine which digital signal sources are active and which are inactive. As explained above, due to the cycling of selector switch (100) and the output of the video and audio signal detectors (101, 102), the CPU (103) registers where all active input signals, digital and analog, are received. Consequently, the management of incoming signals described above can be extended to include the various digital signal sources as well as the analog signal sources. For example, when the user actuates the user interface (7) to switch the signal source currently being displayed on the CRT (5) or played over the speaker (6), the CPU can skip over inactive signal sources, analog and digital, to allow the user to quickly consider only the then-active signal sources.

Additionally, when a new signal source, digital or analog, becomes active after being inactive, the CPU (103) will register the presence of the newly active signal, either through the output of the signal detectors (101, 102) or the error flag signal from the TP/Demux (204). The CPU (103) can then notify the user by displaying a text message or iconographic indicator on the CRT (5), or by providing a new video signal in the secondary picture window of a picture-in-picture display.

It should also be noted that more than one digital signal source can be input through the digital bus interface (203). For example, two separate digital VCRs may both provide an input signal to the digital bus interface (203). The interface (203) time-multiplexes the two signals onto the data transport stream being sent to the TP/Demux (204). The TP/Demux (204) can demultiplex the time-mutliplexed signals to provide a selected one of the signals to the video decoder (205) and audio decoder (206). The TP/Demx (204) communicates to the CPU (103) that two or more digital video signals are available over the digital bus and allows the CPU (103) to control which signal is used. Alternatively, the interface (203) can communicate with the CPU (103) to inform the CPU (103) of the number of digital signals being time-mulitplexed for transmission to the TP/Demux (204).

The preceding description has been presented only to illustrate and describe the invention. It is not intended to be exhaustive or to limit the invention to any precise form disclosed. Many modifications and variations are possible in light of the above teaching.

For example, a stereo audio source has left and right component signals. In such a case, the audio signal detector (102) need only monitor one of the two channels, left or right, for an audio signal. If the audio signal detector (102) is so configured, the audio inputs (106) should be configured to deliver mono-aural signals over the channel, left or right, being monitored by the audio signal detector (102).

Some users will not have their entertainment centers connected to any commercial television broadcast, e.g. over-the-air or cable broadcasts. Such a system would only use the auxiliary signal inputs (106). Consequently, it may be desirable to connect the output of any tuners (2, 8) to the selector switch (100) along with the auxiliary signal inputs. The output of the tuners (2, 8) would then be sampled for active signals with the cycling of selector switch (100). Consequently, the output of the tuners (2, 8) can be treated like any other signal source and skipped if no active signal is there received.

Additionally, in FIG. 3, the TP/Demux (204) selects which of the input digital signals is passed to the CRT (5). Alternatively, a selector switch controlled by the CPU (103) could be provided between the various digital signal sources (201, 202, 203) and the TP/Demux (204) to select the signal provided to the TP/Demux (204).

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A system for managing a plurality of signal inputs to a television set, comprising:

a plurality of audio and video signal inputs;

a central processing unit;

an active signal detection unit which periodically monitors said signal inputs and signals said central processing unit to indicate which of said signal inputs is receiving an active signal;

a tuner; and a selector switch controlled by said central processing unit for selectively connecting either said tuner or one of said signal inputs to a cathode ray tube of said television set, wherein after skipping said inactive signal inputs, said central processing unit controls said selector switch to connect to signal inputs which are inactive when said user interface signals said central processing unit to further change a connection state of said selector switch.

2. A system for managing a plurality of signal inputs to a television set, comprising:

a plurality of audio and video signal inputs;

a central processing unit;

an active signal detection unit which periodically monitors said signal inputs and signals said central processing unit to indicate which of said signal inputs is receiving an active signal, wherein when said active signal detection unit detects a newly-active signal from one of said signal inputs, said central processing unit alerts a user to receipt of said newly-active signal.

3. A system as claimed in claim 2, wherein said central processing unit alerts a user to receipt of said newly-active signal with an audio alert through a speaker of said television set.

4. A system as claimed in claim 2, wherein said central processing unit alerts a user to receipt of said newly-active signal with a visual alert displayed on said cathode ray tube of said television set.

5. A system as claimed in claim 1, wherein:
    said central processing unit controls said selector switch to cycle sequentially to connect said tuner and each active signal input to a video processing circuit;
    said video processing circuit prepares a representative frame of each input signal; and
    said representative frames are displayed on said cathode ray tube to generate a visual index of active input signals.

6. A system as claimed in claim 5, wherein said central processing unit repeatedly cycles said selector switch among said tuner and said active signal inputs to refresh said representative frames prepared by said video processing circuit.

7. A system for managing a plurality of signal inputs to a television set, comprising:
    a plurality of audio and video signal inputs;
    a central processing unit;
    an active signal detection unit which periodically monitors said signal inputs and signals said central processing unit to indicate which of said signal inputs is receiving an active signal;
    a tuner;
    a selector switch controlled by said central processing unit for selectively connecting either said tuner or one of said signal inputs to a cathode ray tube of said television set; and
    a second selector switch controlled by said central processing unit for selectively connecting either said tuner or one of said signal inputs to a video processing circuit, wherein said video processing circuit adds a secondary input signal received through said second selector switch to a primary input signal received through said first selector switch to create a picture-in-picture display on said cathode ray tube.

8. A system as claimed in claim 7, further comprising a second tuner having an output that is provided to said second selector switch.

9. A system for managing a plurality of signal inputs to a television set, comprising:
    a plurality of audio and video signal inputs;
    a central processing unit;
    an active signal detection unit which periodically monitors said signal inputs and signals said central processing unit to indicate which of said signal inputs is receiving an active signal,
    a plurality of digital audiovisual signal inputs that each provide a data transport stream and an error flag signal to a transport parser/demultiplexer;
    wherein said transport parser/demultiplexer provides said error flag signals to said central processing unit so that said central processing unit determines which of said digital audio visual signal inputs is receiving an active signal.

10. A system as claimed in claim 9, wherein said central processing unit controls said transport parser/demultiplexer and a selector switch that selects among said plurality of audio and video signal inputs to connect only active signal inputs to said cathode ray tube of said television set when switching signal sources in response to operation of a user interface.

11. A method of managing a plurality of audio and video signal inputs to a television set with a central processing unit, the method comprising:
    periodically monitoring said signal inputs with an active signal detection unit that signals said central processing unit to indicate which of said signal inputs is receiving an active signal;
    controlling a selector switch with said central processing unit to selectively connect either a tuner or one of said signal inputs to a cathode ray tube of said television set;
    controlling said selector switch with said central processing unit in response to a control signal from a user interface;
    wherein after skipping said inactive signal inputs, said method further comprises controlling said selector switch with said central processing unit to connect to signal inputs which are inactive when said user interface signals said central processing unit to further change a connection state of said selector switch.

12. A method of managing a plurality of audio and video signal inputs to a television set with a central processing unit, the method comprising periodically monitoring said signal inputs with an active signal detection unit that signals said central processing unit to indicate which of said signal inputs is receiving an active signal, further comprising alerting a user to receipt of a newly-active signal when said active signal detection unit detects said newly-active signal from one of said signal inputs.

13. A method as claimed in claim 12, wherein said alerting comprises alerting a user to receipt of said newly-active signal with an audio alert signal through a speaker of said television set.

14. A method as claimed in claim 12, wherein said alerting comprises alerting a user to receipt of said newly-active signal with a visual alert signal displayed on said cathode ray tube of said television set.

15. A method as claimed in claim 11, further comprising:
    controlling said selector switch to cycle sequentially to connect said tuner and each active signal input to a video processing circuit;
    preparing a representative frame of each input signal with said video processing circuit; and
    displaying said representative frames on said cathode ray tube to generate a visual index of active input signals.

16. A method as claimed in claim 15, further comprising repeatedly cycling said selector switch among said tuner and said active signal inputs to refresh said representative frames prepared by said video processing circuit.

17. A method as claimed in claim 11, further comprising:
    controlling a second selector switch with said central processing unit to selectively connect either said tuner or one of said signal inputs to a video processing circuit; and
    adding a secondary input signal received through said second selector switch to a primary input signal received through said first selector switch to create a picture-in-picture display on said cathode ray tube.

18. A method as claimed in claim 17, further comprising providing an output from a second tuner to said second selector switch, where said second tuner is independently controlled by said central processing unit.

19. A method as claimed in claim 17, further comprising automatically connecting said second selector switch to a newly-active signal input, as indicated by said active signal detection unit, to alert a user to said newly-active signal input.

20. A method of managing a plurality of audio and video signal inputs to a television set with a central processing unit, the method comprising periodically monitoring said signal inputs with an active signal detection unit that signals said central processing unit to indicate which of said signal inputs is receiving an active signal receiving a plurality of digital audiovisual signal inputs that each provide a data transport stream and an error flag signal to a transport parser/demultiplexer; and providing said error flag signals to said central processing unit so that said central processing unit determines which of said digital audio visual signal inputs is receiving an active signal.

21. A method as claimed in claim 20, further comprising controlling said transport parser/demultiplexer and a selector switch that selects among said plurality of audio and video signal inputs to connect only active signal inputs to said cathode ray tube of said television set when switching signal sources in response to operation of a user interface.

* * * * *